(12) United States Patent
Nagai

(10) Patent No.: US 10,288,142 B2
(45) Date of Patent: May 14, 2019

(54) SHOCK ABSORBER

(71) Applicant: Koganei Corporation, Koganei-shi, Tokyo (JP)

(72) Inventor: Kiono Nagai, Koganei (JP)

(73) Assignee: KOGANEI CORPORATION, Tokyo (JP)

( * ) Notice: Subject to any disclaimer, the term of this patent is extended or adjusted under 35 U.S.C. 154(b) by 0 days.

(21) Appl. No.: 15/746,566

(22) PCT Filed: Jan. 5, 2016

(86) PCT No.: PCT/JP2016/050099
§ 371 (c)(1),
(2) Date: Jan. 22, 2018

(87) PCT Pub. No.: WO2017/017968
PCT Pub. Date: Feb. 2, 2017

(65) Prior Publication Data
US 2018/0216691 A1    Aug. 2, 2018

(30) Foreign Application Priority Data

Jul. 24, 2015  (JP) ................. 2015-146365

(51) Int. Cl.
*F16F 9/44*  (2006.01)
*F16F 9/346*  (2006.01)

(52) U.S. Cl.
CPC ............... *F16F 9/44* (2013.01); *F16F 9/346* (2013.01); *F16F 2230/186* (2013.01)

(58) Field of Classification Search
CPC .... F16F 9/346; F16F 9/44; F16F 9/443; F16F 9/46; F16F 9/462; F16F 9/466; F16F 9/467; F16F 9/468; F16F 2230/186
See application file for complete search history.

(56) References Cited

U.S. PATENT DOCUMENTS 3,344,894 A * 10/1967 Kenworthy ............... F16F 9/44
                                                      137/625.3
3,510,117 A *  5/1970 Pedersen ................... F16F 9/44
                                                      188/285
(Continued)

FOREIGN PATENT DOCUMENTS

FR    2902850 A1 * 12/2007 .............. F16F 9/346
JP    S6449710 U      3/1989
(Continued)

OTHER PUBLICATIONS

English-language abstract for FR 2902850 (no date).*
International Search Report for PCT Serial No. PCT/JP2016/050099 dated Feb. 9, 2016.

*Primary Examiner* — Nicholas J Lane
(74) *Attorney, Agent, or Firm* — McCormick, Paulding & Huber LLP

(57) ABSTRACT

A shock absorber (10) has a case (11) in which a piston rod (25) is disposed, the piston rod (25) being reciprocable in an axial direction of the case (11), and a rotation cylinder (14) is rotatably provided inside the case (11) and is movable in the axial direction of the case (11). A cylinder hole (35) is partitioned by a piston (32) provided on the piston rod (25) into a front-side chamber (35a) and a rear-side chamber (35b). A spring force of a compression coil spring (37) urges the piston rod (25) in a direction to protrude from the case (11). An orifice (42), whose communication opening degree with a fluid passage (34) varies according to a rotated position of a rotation operation portion (15), is formed on the rotation operation portion (15), and positioning recesses are formed on the case (11) and are spaced apart from each other at intervals in a circumferential direction of the case (11).

7 Claims, 18 Drawing Sheets

(56) References Cited

U.S. PATENT DOCUMENTS

| | | | | |
|---|---|---|---|---|
| 3,840,097 A | * | 10/1974 | Holley | F16F 9/44 |
| | | | | 188/287 |
| 5,598,904 A | * | 2/1997 | Spyche, Jr. | F16F 9/34 |
| | | | | 188/287 |
| 2004/0020729 A1 | * | 2/2004 | Bertrand | F16F 9/44 |
| | | | | 188/285 |
| 2015/0362040 A1 | * | 12/2015 | Fujihara | F16F 13/007 |
| | | | | 267/140.11 |

FOREIGN PATENT DOCUMENTS

| | | |
|---|---|---|
| JP | 6-37641 U | 5/1994 |
| JP | H06346938 A | 12/1994 |
| JP | H07103279 A | 4/1995 |

\* cited by examiner

SHOCK ABSORBER

CROSS-REFERENCE TO RELATED APPLICATIONS

This application is a National Stage application of International Patent Application No. PCT/JP2016/050099, filed on Jan. 5, 2016, which claims priority to Japanese Patent Application No. 2015-146365, filed on Jul. 24, 2015, each of which is hereby incorporated by reference in its entirety.

TECHNICAL FIELD

The present invention relates to a shock absorber for reducing an impact force applied to a moving member when stopping the moving member.

BACKGROUND ART

A shock absorber, or a damper, is utilized for reducing an impact force applied to a moving member when stopping the moving member at a movement end position.

A hydraulic damper described in Japanese Unexamined Patent Application Publication No. H06-346938 has an outer case in which oil is filled and a damper case disposed inside the outer case, and a passage through which oil flows is formed between the outer case and the damper case. A piston is disposed inside the damper case and is reciprocable in an axial direction of the damper case, and a piston rod attached to the piston protrudes to the outside from a proximal end portion of the outer case. When a moving member collides with a proximal end of the piston rod, oil inside a rear-side chamber flows from an orifice formed on a bottom portion of the damper case, through the passage, and to a front-side chamber. At this time, a passing resistance of the oil is applied to the piston as a drag force, kinetic energy of the moving member is absorbed by this drag force of the oil, and thus, an impact force applied to the moving member is reduced. In order to adjust a drag characteristic, or a damping characteristic, of the damper, a needle shaft for changing a flow rate of oil flowing from the orifice to the passage is provided on a rear wall of the outer case, and the needle shaft is fixed to the rear wall with a nut.

A fluid pressure damper described in Japanese Unexamined Utility Model (Registration) Application Publication No. H06-37641 has a reservoir tube serving as an outer case and a pressure tube installed inside the reservoir tube, and a throttle hole through which pressurized oil inside the pressure tube flows out is formed on an inner cover of the pressure tube. In order to adjust a damping characteristic, an eccentric cam for changing the size of an opening of the throttle hole is provided on a bottom portion of the reservoir tube, and the eccentric cam is fixed to the reservoir tube with a locking screw.

A hydraulic damper for damping vehicle vibration is described in Japanese Unexamined Patent Application Publication No. H07-103279, and a compression coil spring is disposed on an outside portion of the hydraulic damper. This hydraulic damper has an outer cylinder and an inner cylinder, a piston is disposed inside the inner cylinder and is reciprocable in an axial direction of the inner cylinder, and a piston rod attached to the piston protrudes to the outside. A reservoir chamber formed between the outer cylinder and the inner cylinder communicates with a rod-side oil chamber formed inside the inner cylinder through an orifice passage formed on the inner cylinder, a rod guide main body for adjusting a communication opening degree of the orifice passage is fitted to the inner cylinder, and a plurality of orifices are formed on the rod guide main body. A rotation angle of the rod guide main body is regulated by the rotation regulating pin.

SUMMARY

According to the damper described in Japanese Unexamined Patent Application Publication No. H06-346938, after an opening degree of the orifice is adjusted by the needle shaft, the needle shaft is fixed to the outer case with a nut. Further, according to the fluid pressure damper described in Japanese Unexamined Utility Model (Registration) Application Publication No. H06-37641, after the size of the opening of the throttle hole is adjusted by the eccentric cam, the eccentric cam is fixed to the reservoir tube with the locking screw. In this manner, since such a damper having a needle shaft that is fixed to the damper with a nut, or such a damper having an eccentric cam that is fixed to the damper with a locking screw, requires a fastening operation using a nut or the like, the opening degree of the orifice cannot be easily changed, and the damping characteristic cannot be easily adjusted.

An object of the present invention is to provide a shock absorber with superior operability, by facilitating adjustment of the damping characteristic of the shock absorber.

According to one aspect of the present invention, there is provided a shock absorber comprising: a case in which a piston rod is disposed and in which fluid is filled, the piston rod being reciprocable in an axial direction of the case; a rotation cylinder having: a cylindrical portion; and a rotation operation portion that is rotatably supported by a distal end portion of the case and is movable in the axial direction of the case; a piston that is provided on a distal end portion of the piston rod and partitions an inside of the cylindrical portion into a front-side chamber and a rear-side chamber; a spring member that is disposed inside the rear-side chamber and abuts on the rotation cylinder, the piston rod being urged by a spring force of the spring member toward a direction in which a protruding end portion of the piston rod protrudes from a proximal end portion of the case; and an orifice that is changed in size according to a rotated position of the rotation operation portion, wherein a stepped surface of the rotation cylinder and a stopper surface of the case are capable of abutting on each other.

The shock absorber has the case and the rotation cylinder rotatably disposed inside the case, and the inside of the cylindrical portion of the rotation cylinder is partitioned into the front-side chamber and the rear-side chamber by the piston provided on the distal end portion of the piston rod. The spring member having a spring force that urges the piston rod in a direction to protrude from the case is provided in the rear-side chamber, and an opening degree of the orifice that varies according to the rotated position of the rotation operation portion. Therefore, rotating the rotation cylinder through the rotation operation portion allows a communication opening degree of the orifice to be easily adjusted. Thus, the damping characteristic of the shock absorber may be easily adjusted.

Since the stepped surface of the rotation cylinder and the stopper surface of the case abut on each other, impact and force applied to the rotation cylinder are transmitted from the rotation cylinder to the case without being transmitted to other members of the shock absorber. Thus, durability of the shock absorber may be improved.

DETAILED DESCRIPTION

Figure 1:
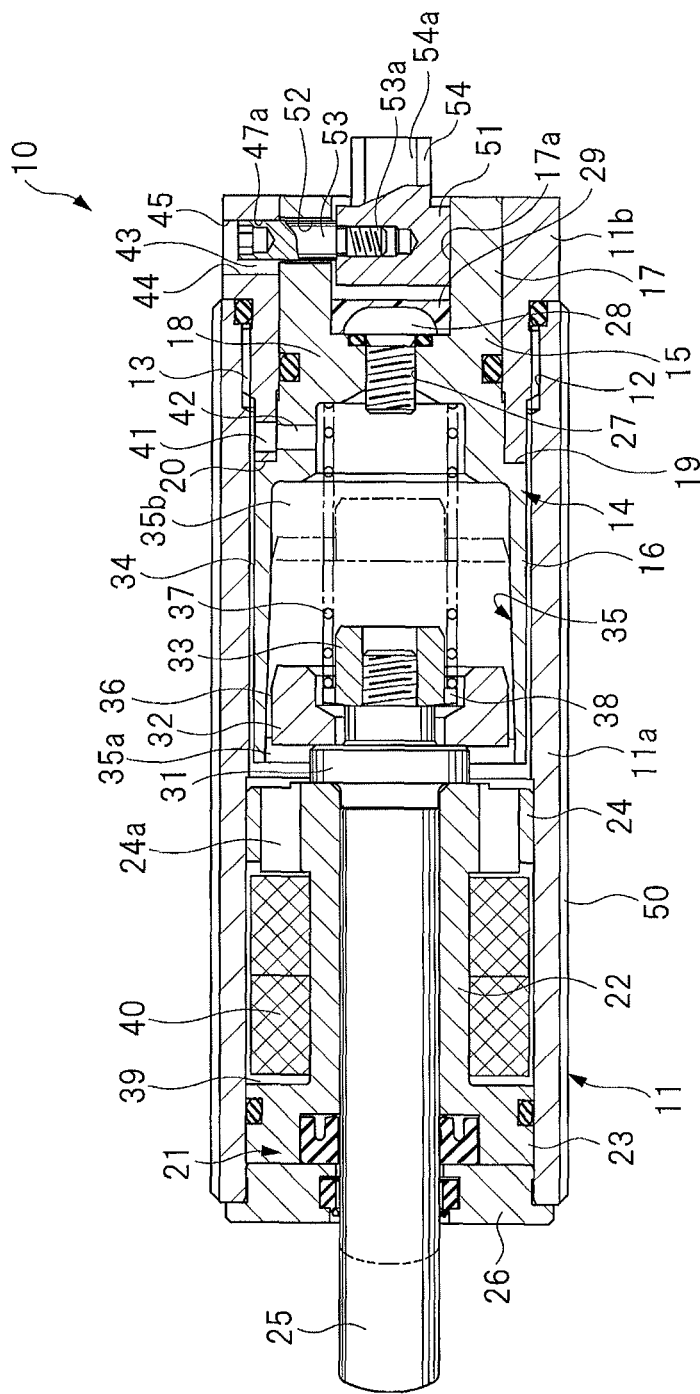
FIG. 1 is a longitudinal sectional view showing a shock absorber according to one embodiment of the present invention.

Hereinafter, embodiments of the present invention will be described in detail with reference to the drawings. In the drawings, members having the same characteristics as each other are denoted by the same reference numerals.

FIGS. 1 to 11 show a shock absorber 10 according to one embodiment of the present invention. This shock absorber 10 has a case 11 constituted by a cylindrical proximal case 11a and a distal case 11b that is fixed to a distal end portion of the proximal case 11a. A female screw 12 is provided on the distal end portion of the proximal case 11a, a male screw 13 that is screwed to the female screw 12 is provided on the distal case 11b, and thus, the distal case 11b is screwed to the proximal case 11a.

A rotation cylinder 14 is disposed inside a distal end portion of the case 11. The rotation cylinder 14 comprises: a rotation operation portion 15 that is rotatably supported by the distal case 11b and is movable in an axial direction of the distal case 11b; and a proximal cylindrical portion 16 that is integral with a proximal end of the rotation operation portion 15. The rotation operation portion 15 comprises: a distal cylindrical portion 17 that is fitted to an inner peripheral surface of the distal case 11b; and a closed wall 18 that is provided on an axial center portion of the distal cylindrical portion 17. A radial stepped surface 19 is provided between the proximal cylindrical portion 16 and the distal cylindrical portion 17, and the stepped surface 19 is capable of abutting on a stopper surface 20 provided on a side at a proximal end portion of the distal case 11b.

A holder 21 is disposed inside a proximal end portion of the case 11. The holder 21 has a tubular portion 22, a flange 23 is integrally provided on a proximal end of the tubular portion 22, and a flange 24 is integrally provided on a rear end of the tubular portion 22. A piston rod 25 is partially disposed inside the holder 21 and is reciprocable in an axial direction of the holder 21, and a proximal end portion of the piston rod 25 is capable of protruding from the proximal end portion of the case 11. A rod cover 26 is attached to a proximal end of the case 11, and the flange 23 of the holder 21 abuts on an inner surface of the rod cover 26. For the above-mentioned shock absorber 10, the end from which the piston rod 25 protrudes is described as a proximal end, and the opposite end is described as a distal end.

Working oil, or working fluid, is filled in the case 11. An injection hole 27 used for filling the case 11 with working oil is formed on the closed wall 18 of the rotation operation portion 15, and the injection hole 27 communicates with an opening 17a on the distal cylindrical portion 17. After the case 11 is filled with fluid through the injection hole 27, the injection hole 27 is closed by a screw member 28. A head portion of the screw member 28 is prevented from loosening by a sealing material 29 made of an adhesive or the like. The above-mentioned members are respectively sealed by sealing members so that the working oil is prevented from leaking out of the case 11.

A stopper 31 is provided on the piston rod 25. The stopper 31 has a diameter that is larger than an inner diameter of the tubular portion 22 of the holder 21, and a proximal end surface of the stopper 31 abuts on the flange 24 of the holder 21. A piston 32 is disposed on a rear end portion of the piston rod 25 and is capable of abutting on a rear end surface of the stopper 31. A spring receiving member 33 is attached to a distal end portion of the piston rod 25. The piston 32 is axially movable, with respect to the piston rod 25, between a position at which the piston 32 abuts on the stopper 31 and a position at which the piston 32 abuts on the spring receiving member 33.

A fluid passage 34 is formed between the proximal cylindrical portion 16 of the rotation cylinder 14 and the case 11. A cylinder hole 35 formed in the proximal cylindrical portion 16 is partitioned by the piston 32 into a front-side chamber 35a on the same side as a proximal end surface of the piston 32 and a rear-side chamber 35b on the same side as a distal end surface of the piston 32. The front-side chamber 35a communicates with a proximal end portion of the fluid passage 34, and the rear-side chamber 35b communicates with a rear end portion of the fluid passage 34. The cylinder hole 35 is partially formed by a tapered surface with its inner diameter gradually decreasing from a proximal end portion toward a rear end portion of the cylinder hole 35. Thus, a size of a gap 36 between the piston 32 and the cylinder hole 35 gradually decreases when the piston 32 moves toward a rear end portion of the proximal cylindrical portion 16.

A compression coil spring 37 serving as a spring member is disposed inside the rear-side chamber 35b. The compression coil spring 37 has a proximal end that abuts on the spring receiving member 33 and a rear end that abuts on the closed wall 18, and a spring force of the compression coil spring 37 urges the piston rod 25 toward a direction in which a protruding end portion of the piston rod 25 protrudes from the proximal end portion of the case 11. When a moving member (not shown) collides with a proximal end of the piston rod 25, the piston rod 25 is moved backward against the spring force of the compression coil spring 37. When the piston rod 25 is moved backward, the stopper 31 abuts on the proximal end surface of the piston 32, and a gap between the stopper 31 and the piston 32 is closed. Thus, the fluid inside the rear-side chamber 35b flows through the gap 36 between the piston 32 and the cylinder hole 35 without flowing through the gap between the stopper 31 and the piston 32. Since the cylinder hole 35 has a tapered surface, the gap 36 is gradually narrowed as the piston 32 moves toward a distal end portion of the cylinder hole 35, and thus, a flow resistance of the working oil flowing through the gap 36 is increased.

In contrast, when the moving member is separated from the piston rod 25, the piston rod 25 is moved to protrude toward a protruding limit position by the spring force of the compression coil spring 37. Since the piston 32 separates from the stopper 31 and abuts on the spring receiving member 33, a gap is formed between the piston 32 and the stopper 31 at this time. A communication passage 38 is formed between the spring receiving member 33 and the piston 32, and when the piston rod 25 is moved to protrude, the fluid inside the front-side chamber 35a flows through both the communication passage 38 and the gap 36 in parallel with each other, and further flows into the rear-side chamber 35b. Therefore, since the fluid also flows into the communication passage 38 when the piston rod 25 is moved to protrude, the flow resistance of the fluid applied to the piston rod 25 is smaller than the flow resistance of the fluid applied to the piston rod 25 when the piston rod 25 is moved backward, thereby allowing the piston rod 25 to quickly return to the protruding limit position. In this manner, the stopper 31 and the piston 32 collectively form a check valve.

An accumulator chamber 39 is partitioned by the tubular portion 22 of the holder 21 and the flanges 23 and 24 respectively provided on the front and rear of the holder 21. An accumulator 40 having a volume which is variable is disposed inside the accumulator chamber 39. The accumulator chamber 39 communicates with the front-side chamber 35a through a communication passage 24a formed on the flange 24. Therefore, when the piston rod 25 is moved backward against the spring force, the fluid flowed into the front-side chamber 35a further flows into the accumulator chamber 39 through the communication passage 24a. Thus, the accumulator 40 is contracted. In contrast, when the piston rod 25 is moved to protrude by the spring force, the accumulator 40 is expanded, and the fluid inside the accumulator chamber 39 returns to the front-side chamber 35a through the communication passage 24a.

Figure 3:
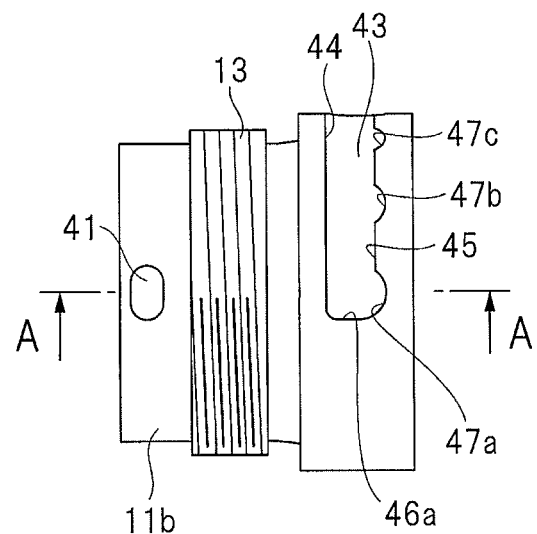
FIG. 3 is a plan view showing a distal case of FIG. 1.
Figure 4:
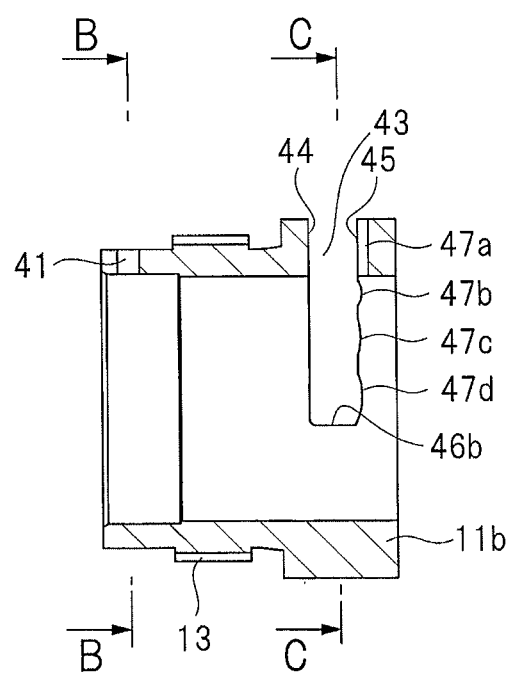
FIG. 4 is a sectional view taken along line A-A of FIG. 3.
Figure 5:
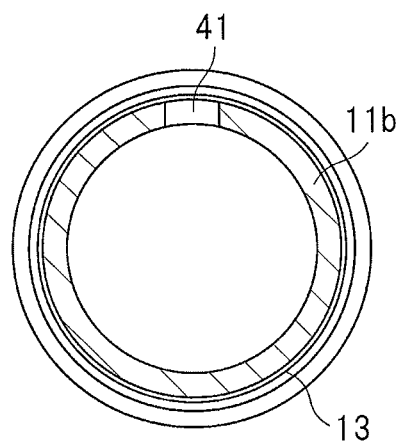
FIG. 5 is a sectional view taken along line B-B of FIG. 4.
Figure 6:
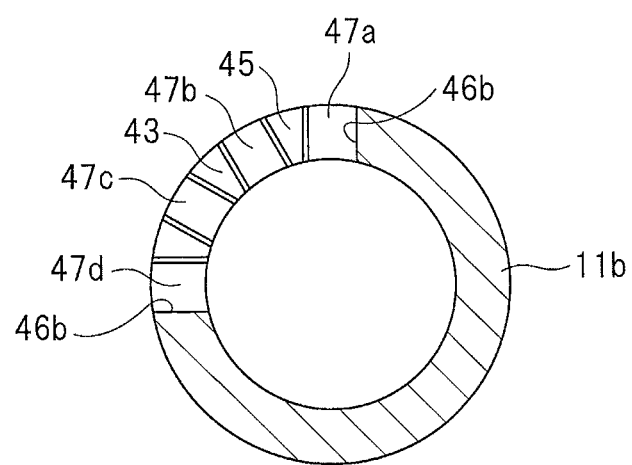
FIG. 6 is a sectional view taken along line C-C of FIG. 4.
Figure 7:
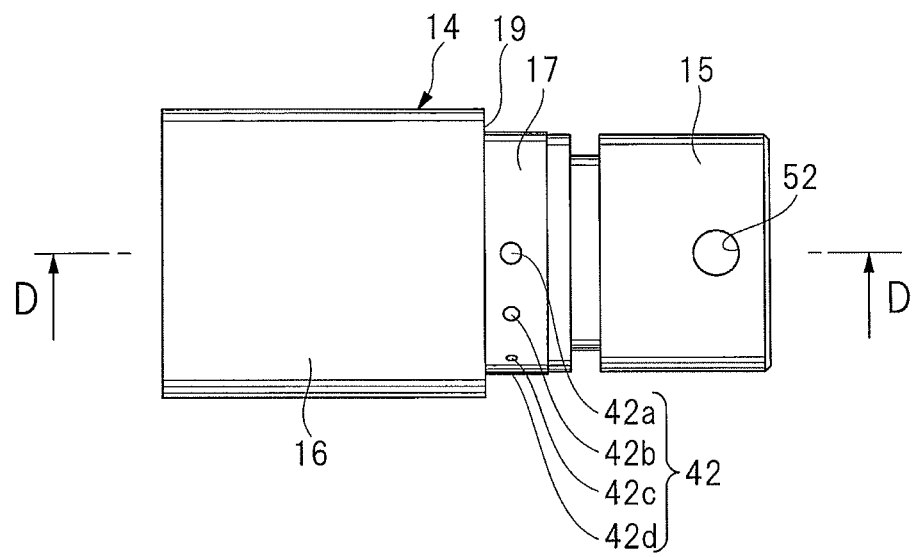
FIG. 7 is a plan view showing a rotation cylinder of FIG. 1.
Figure 8:
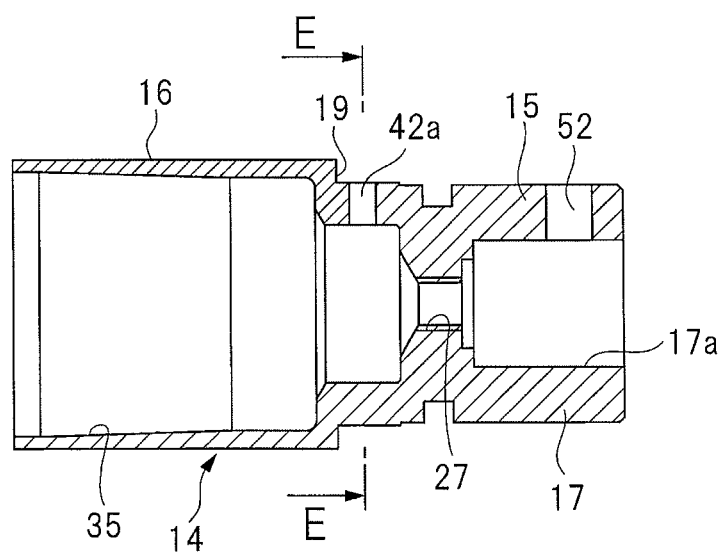
FIG. 8 is a sectional view taken along line D-D of FIG. 7.
Figure 9:
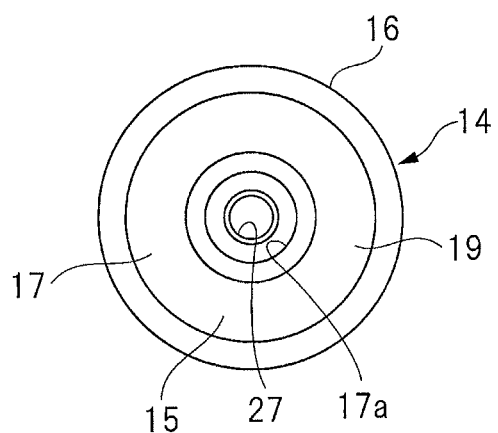
FIG. 9 is a right side view of FIG. 7.

FIG. 3 is a plan view showing the distal case 11b of FIG. 1. FIG. 4 is a sectional view taken along line A-A of FIG. 3, FIG. 5 is a sectional view taken along line B-B of FIG. 4, and FIG. 6 is a sectional view taken along line C-C of FIG. 4. FIG. 7 is a plan view showing the rotation cylinder 14 of FIG. 1. FIG. 8 is a sectional view taken along line D-D of FIG. 7, FIG. 9 is a right side view of FIG. 7, and FIG. 10 is a sectional view taken along line E-E of FIG. 8.

As shown in FIG. 1 and FIGS. 3 to 5, a communication hole 41 is formed on the proximal end portion of the distal case 11b, and the communication hole 41 communicates with a distal end portion of the fluid passage 34. As shown in FIGS. 7 and 8, an orifice 42 is formed on the rotation operation portion 15, and the orifice 42 communicates with the distal end portion of the fluid passage 34 through the communication hole 41.

Figure 10:
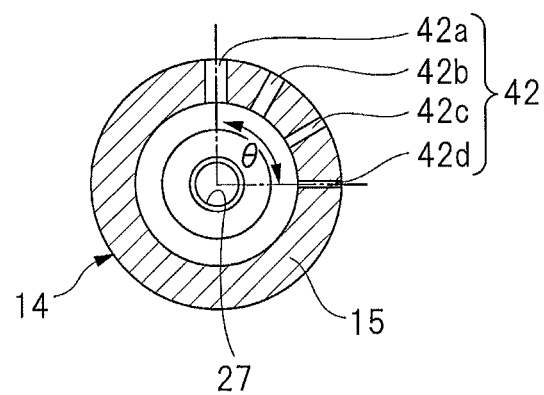
FIG. 10 is a sectional view taken along line E-E of FIG. 8.

As shown in FIGS. 7 and 10, the orifice 42 is constituted by four through holes 42a to 42d. The four through holes 42a to 42d are formed on the distal cylindrical portion 17 of the rotation operation portion 15, are spaced apart from each other at predetermined intervals in a circumferential direction of the distal cylindrical portion 17, and radially penetrate the distal cylindrical portion 17. By rotating the rotation operation portion 15, any one of the four through holes 42a to 42d may be positioned at a same circumferential-direction position as the communication hole 41, thereby allowing the positioned through hole and the communication hole 41 to communicate with each other. Since the through holes 42a to 42d respectively have inner diameters that differ from each other, a communication opening degree between the rear-side chamber 35b and the fluid passage 34 that varies according to a rotated position of the rotation operation portion 15. Of the through holes 42a to 42d, the through hole 42a has the largest inner diameter, and the inner diameters of the other through holes gradually decrease toward the through hole 42d. When the through hole 42a is set at the same circumferential-direction position as the communication hole 41, the communication opening degree of the orifice 42 becomes the largest. When the through hole 42d is set at the same circumferential-direction position as the communication hole 41, the communication opening degree of the orifice 42 becomes the smallest. When the through hole 42b or the through hole 42c is set at the same circumferential-direction position as the communication hole 41, the communication opening degree of the orifice 42 becomes smaller than the communication opening degree of the through hole 42a, but larger than the communication opening degree of the through hole 42d. As shown in FIG. 10, an angle $\theta$ between a center axis of the through hole 42a and a center axis of the through hole 42d is approximately 90 degrees, and the orifice 42 is formed within a range of this rotation angle $\theta$ of the rotation operation portion 15.

As shown in FIGS. 3, 4 and 6, a guide hole 43 is formed on the distal case 11b of the case 11 and extends in a circumferential direction of the distal case 11b. The guide hole 43 has: a front-side circumferential surface 44 that faces a rear end of the case 11; a rear-side circumferential surface 45 that faces the proximal end portion of the case 11; and end surfaces 46a and 46b that each extend in the circumferential direction of the distal case 11b. Four positioning recesses 47a to 47d are formed on the rear-side circumferential surface 45 and are spaced apart from each other at intervals in the circumferential direction of the distal case 11b.

Figure 2:
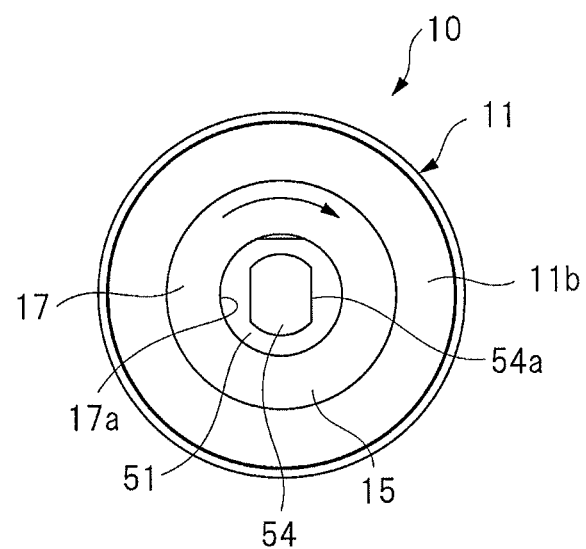
FIG. 2 is a right side view of FIG. 1.

As shown in FIG. 1, an operation plug 51 is provided inside the opening 17a on the distal cylindrical portion 17 of the rotation operation portion 15. An attaching hole 52 is formed on the distal cylindrical portion 17 of the rotation operation portion 15, and a screw portion 53a of a positioning pin 53 is screwed to the operation plug 51. By fitting the positioning pin 53 inside the attaching hole 52, the operation plug 51 becomes integral with the rotation operation portion 15, that is, the rotation cylinder 14. The rotation operation portion 15 is positioned to its rotated position by the positioning pin 53 and the positioning recesses 47a to 47d that collectively serve as positioning means. The positioning means is constituted by the positioning pin 53 and the positioning recesses 47a to 47d. The positioning pin 53 is inserted into the guide hole 43. A protrusion portion 54 is integrally provided on the operation plug 51, and the protrusion portion 54 protrudes from a distal end surface of the case 11. As shown in FIG. 2, the protrusion portion 54 has a double-sided portion 54a that is flat on each side, and a rotation operation tool, such as a wrench, is engaged with the double-sided portion 54a of the protrusion portion 54 so that the operation plug 51 is rotated as necessary.

Figure 11A:
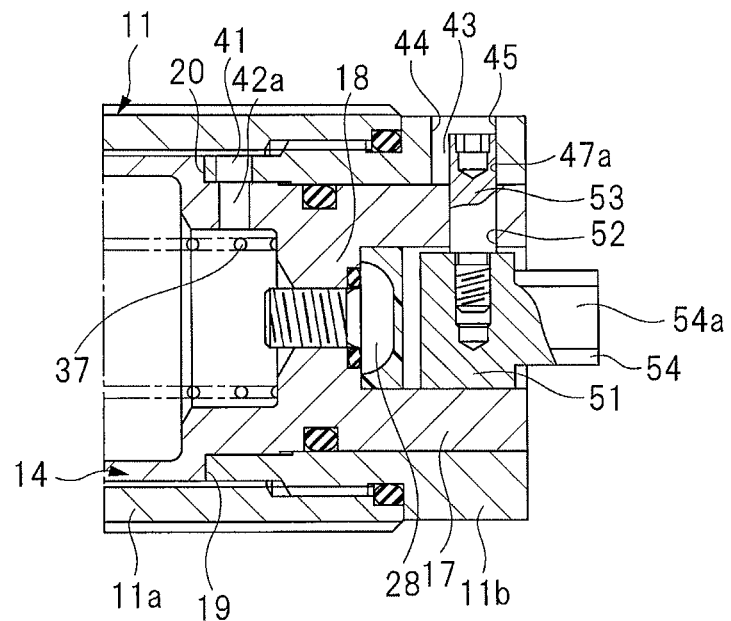
FIG. 11(A) is a sectional view showing a distal end portion of the case of FIG. 1.
Figure 11B:
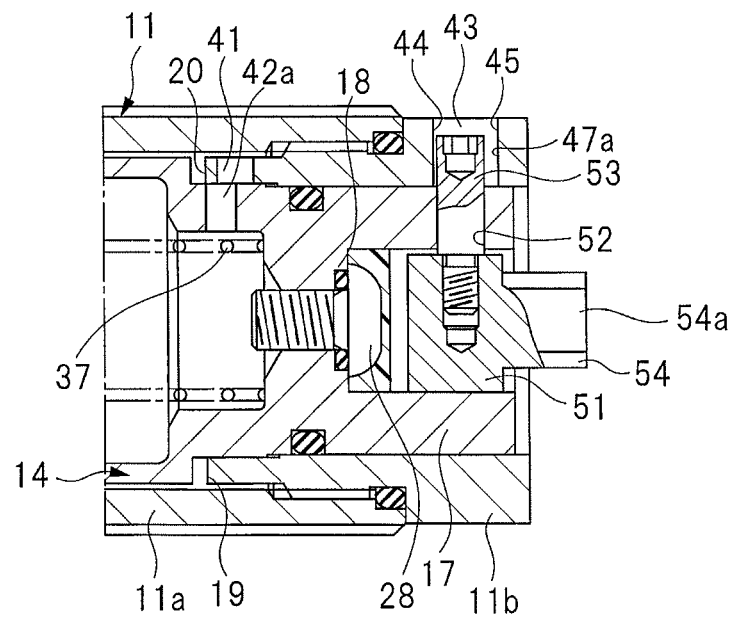
FIG. 11(B) is a sectional view showing the distal end portion of the case of FIG. 1, with a rotation cylinder moved in an axial direction of the case when a communication opening degree of an orifice is being adjusted.

As shown in FIG. 11(A), the stepped surface 19 of the rotation cylinder 14 is pressed onto the stopper surface 20 by the spring force of the compression coil spring 37. In order to adjust the communication opening degree of the orifice 42, the rotation operation tool, such as a wrench, is engaged with the double-sided portion 54a, and the protrusion portion 54 is rotated so that the operation plug 51 is rotated. This causes the positioning pin 53 to be released from the positioning recess 47a, and the positioning pin 53 moves onto the rear-side circumferential surface 45 between the positioning recess 47a and the positioning recess 47b. At this time, the rotation cylinder 14 moves toward a front side of the case 11 in an axial direction of the case 11, as shown in FIG. 11(B). When the operation plug 51 is further rotated by the rotation operation tool, the positioning pin 53 is positioned in the positioning recess 47b by the spring force of the compression coil spring 37. In this manner, the positioning pin 53 is positioned in a desired recess selected from the positioning recesses 47a to 47d.

When the positioning pin 53 is positioned in the positioning recess 47a, the shock absorber 10 is in a state in which the through hole 42a of the orifice 42 and the communication hole 41 are communicating with each other. When the positioning pin 53 is positioned in the positioning recess 47b, the shock absorber 10 is in a state in which the through hole 42b and the communication hole 41 are communicating with each other. When the positioning pin 53 is positioned in the positioning recess 47c, the shock absorber 10 is in a state in which the through hole 42c and the communication hole 41 are communicating with each other. Likewise, when the positioning pin 53 is positioned in the positioning recess 47d, the shock absorber 10 is in a state in which the through hole 42d and the communication hole 41 are communicating with each other. In each of these states, the stepped surface 19 is pressed onto the stopper surface 20 by the spring force of the compression coil spring 37, and the rotation cylinder 14 is stopped from moving backward. At this time, the attaching hole 52 and a bottom surface of the corresponding positioning recess are set so that a gap is formed between the positioning pin 53 and the bottom surface of the positioning recess, preventing the positioning pin 53 to be in close contact with the bottom surface of the positioning recess. When the shock absorber absorbs impact, pressure of the fluid is increased, and impact is applied to the rotation cylinder 14 in a direction toward the distal end portion of the rotation cylinder 14. Moreover, since the piston 32 moves backward, the compression coil spring 37 is further compressed by the piston, and a force is further applied to the rotation cylinder 14 in the direction toward the distal end portion of the rotation cylinder 14. This impact and force applied to the rotation cylinder 14 in the direction toward the distal end portion of the rotation cylinder 14 are transmitted from the stepped surface 19 of the rotation cylinder 14 to the distal case 11b. However, since the gap is formed between the positioning pin 53 and the bottom surface of the corresponding positioning recess, impact and force applied to the rotation cylinder 14 in the direction toward the distal end portion of the rotation cylinder 14 are prevented from being transmitted to the positioning pin 53 and the bottom surface of the positioning recess. Thus, the positioning pin 53 and the bottom surface of the corresponding positioning recess are protected and are prevented from damage or breakage. In other words, since the stepped surface 19 of the rotation cylinder 14 and the stopper surface 20 abut on each other, impact and force applied to the rotation cylinder 14 are transmitted from the rotation cylinder 14 to the case 11 without being transmitted to other members of the shock absorber 10. Thus, durability of the shock absorber may be improved.

FIG. 1 shows the shock absorber 10 in a state in which the through hole 42a of the orifice 42 and the fluid passage 34 are communicating with each other through the communication hole 41. From this state, when the moving member collides with the piston rod 25, the working oil inside the rear-side chamber 35b flows into the front-side chamber 35a through the gap 36 while also flowing into the rear end portion of the fluid passage 34 through the through hole 42a and the communication hole 41, and further flows into the front-side chamber 35a. The gap 36 is gradually narrowed as the piston 32 moves toward the distal end portion of the cylinder hole 35, and thus, the flow resistance of the working oil flowing through the gap 36 is increased. In this manner, the working oil flows into the front-side chamber 35a while being subjected to a passing resistance caused by the gap 36 and the orifice 42. The working oil that flowed into the front-side chamber 35a further flows into the accumulator chamber 39 through the communication passage 24a, and thus, the accumulator 40 is contracted. Therefore, the passing resistance of the working oil is applied to the backward-moving piston 32 as a drag force, a kinetic energy of the moving member is absorbed by the drag force of the working oil, and thus, an impact force applied to the moving member is reduced.

A drag characteristic, or a damping characteristic, that is achieved by the passing resistance of the working oil is adjusted by rotating the rotation cylinder 14 and selecting one of the through holes 42a to 42d. When the rotation cylinder 14 is rotated so that the through hole 42d with the smallest inner diameter faces the communication hole 41, the drag characteristic is set to be the highest.

As shown in FIG. 1, the positioning pin 53 is provided at a position that is in parallel with the through hole 42a, and in order to rotate the rotation cylinder 14 so that a position in which the through hole 42a with the largest inner diameter and the communication hole 41 face each other is changed to a position in which the through hole 42d with the smallest inner diameter and the communication hole 41 face each other, the rotation cylinder 14 is rotated in a clockwise direction, as shown by an arrow in FIG. 2. In this manner, the rotation cylinder 14 is rotated in the clockwise direction so as to be switched from a state in which the through hole 42a with the largest inner diameter and the communication hole 41 are communicating with each other to a state in which the through hole 42d with the smallest inner diameter and the communication hole 41 are communicating with each other.

On the other hand, in a structure in which the through hole 42d with the smallest inner diameter is formed at the same position as the through hole 42a shown in FIG. 10, and the through hole 42a with the largest inner diameter is formed at the same position as the through hole 42d shown in FIG. 10, with the positioning pin 53 being provided at a position that is in parallel with the through hole 42d, the rotation cylinder 14 is rotated in the clockwise direction as shown in FIG. 2 so as to be switched from a state in which the through hole 42d with the smallest inner diameter and the communication hole 41 are communicating with each other to a state in which the through hole 42a with the largest inner diameter and the communication hole 41 are communicating with each other.

In order to adjust the drag characteristic achieved by the working oil according to a position in which the shock absorber 10 is used, the rotation operation tool is engaged with the double-sided portion 54a as mentioned above, and the protrusion portion 54 is rotated so that the rotation cylinder 14 is rotated. In this manner, the positioning pin 53 is positioned in one of the four positioning recesses 47a to 47d so that the drag characteristic may be switched between, for example, any one of four levels.

With the positioning pin 53 positioned in one of the positioning recesses, the stepped surface 19 of the rotation cylinder 14 is moved to abut on the stopper surface 20 by the spring force of the compression coil spring 37, and thus, the positioning pin 53 is fixed in the desired positioning recess. Since the spring force is applied to the rotation cylinder 14, the orifice 42 and the communication hole 41 continue to communicate with each other without the rotation cylinder 14 being rotated. In this manner, the opening degree of the orifice 42 may be changed by rotating the rotation cylinder 14, and the damping characteristic of the shock absorber 10 may be easily adjusted, making it is possible to obtain the shock absorber 10 with superior operability.

A male screw 50 is provided on an outer peripheral surface of the proximal case 11a. By disposing the shock absorber 10 inside an attaching member (not shown) and screwing a nut to the male screw 50, the shock absorber 10 may be mounted on the attaching member.

When the shock absorber 10 is used, the distal end portion of the case 11 is in some cases blocked by an external member. However, since a "click" feeling is transmitted to an operator's hand when the operator rotates the rotation cylinder 14 and the positioning pin 53 moves onto the rear-side circumferential surface 45 between any of adjacent positioning recesses 47a to 47d, the operator is able to sense which positioning recess the positioning pin 53 is in. Thus, the damping characteristic may be easily adjusted without the necessity to visually observe the positioning pin 53 from the outside.

Although the orifice 42 is constituted by the four through holes respectively having inner diameters that differ from each other as shown in FIGS. 7 and 10, the orifice 42 may instead be constituted by three through holes 42a to 42c without the through hole 42d having the smallest inner diameter. In this structure, when the positioning pin 53 is set in the positioning recess 47d, the working oil inside the rear-side chamber 35b flows into the front-side chamber 35a solely through the gap 36. The number of through holes that constitute the orifice 42 is not limited to the above-mentioned numbers and may be set to any desired number. Moreover, the central angle subtended by the through hole 42a and the through hole 42d is not limited to be approximately 90 degrees shown in FIG. 10, and may be set to any desired angle.

Figure 12:
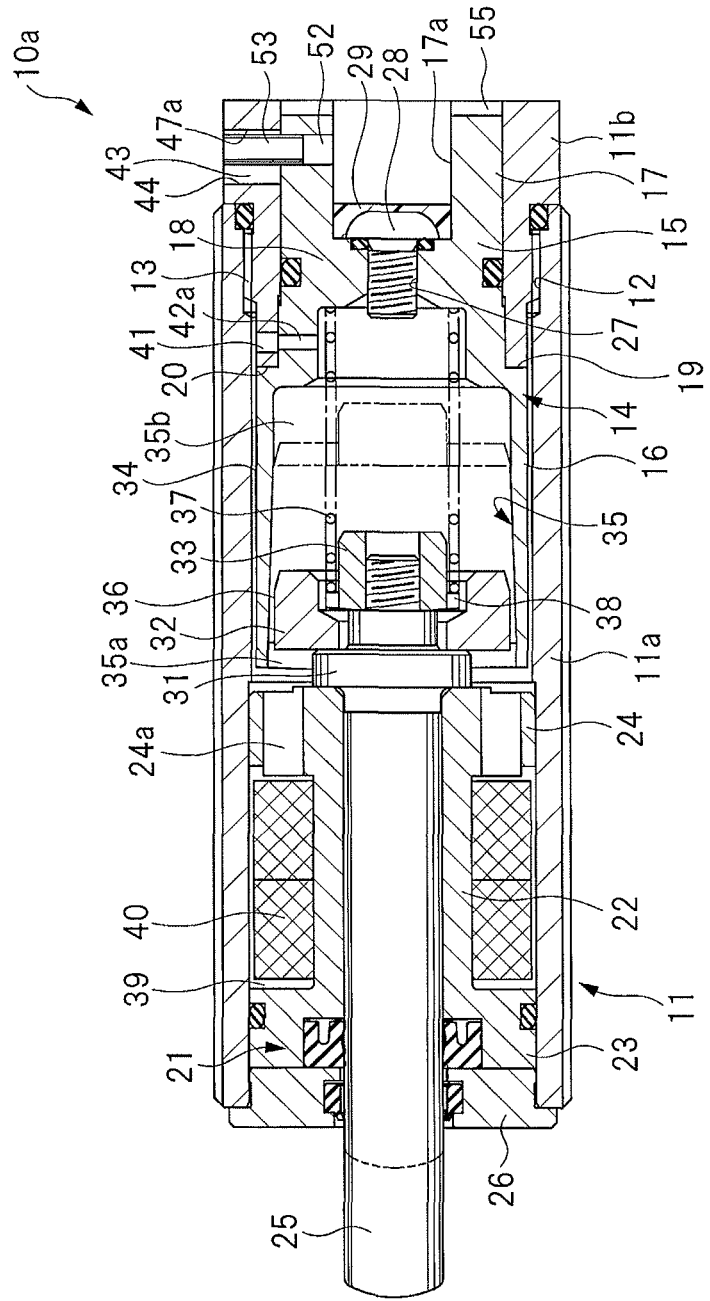
FIG. 12 is a longitudinal sectional view showing a shock absorber according to another embodiment of the present invention.
Figure 13:
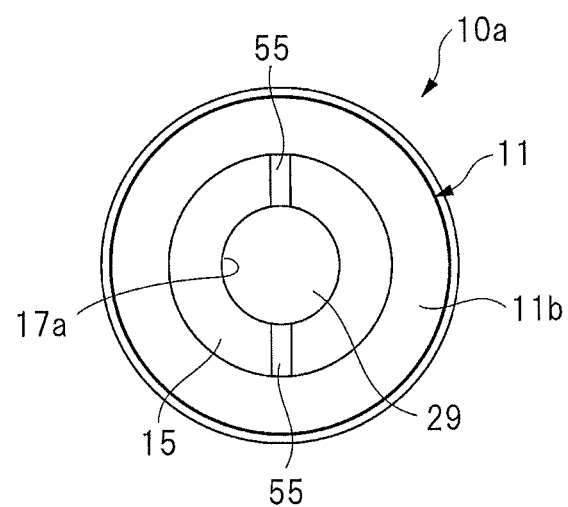
FIG. 13 is a right side view of FIG. 12.

FIG. 12 is a longitudinal sectional view showing a shock absorber 10a according to another embodiment of the present invention, and FIG. 13 is a right side view of FIG. 12.

In this shock absorber 10a, the operation plug 51 shown in FIG. 1 is not provided on the distal cylindrical portion 17 of the rotation operation portion 15, and the screw portion 53a that is screwed to the operation plug 51 is not provided on the positioning pin 53. The positioning pin 53 is fixed to the attaching hole 52 formed on the distal cylindrical portion 17 of the rotation operation portion 15, protrudes radially outward from the distal cylindrical portion 17, and extends into the guide hole 43. The shape of the guide hole 43 is the same as the shape of the guide hole 43 of the shock absorber 10 shown in FIG. 1. As in the above-mentioned embodiment, the rotation operation portion 15 is positioned to its rotated position by the positioning pin 53 and the positioning recesses 47a to 47d that collectively serve as positioning means. The positioning means is constituted by the positioning pin 53 and the positioning recesses 47a to 47d.

A slit 55 is formed on a rear end surface of the rotation operation portion 15 and allows the rotation operation tool to engage with the rotation operation portion 15 of the rotation cylinder 14. The rotation operation tool (not shown) having a convex portion is engaged with this slit 55 in order to rotate the rotation cylinder 14. In this manner, the rotation operation portion 15 to which the rotation operation tool is engaged may be of a convex structure in which the rotation operation portion 15 is provided with the protrusion portion 54 as shown in FIG. 1, or may be of a concave structure in which the rotation operation portion 15 is provided with the slit 55 as shown in FIG. 12.

Figure 14:
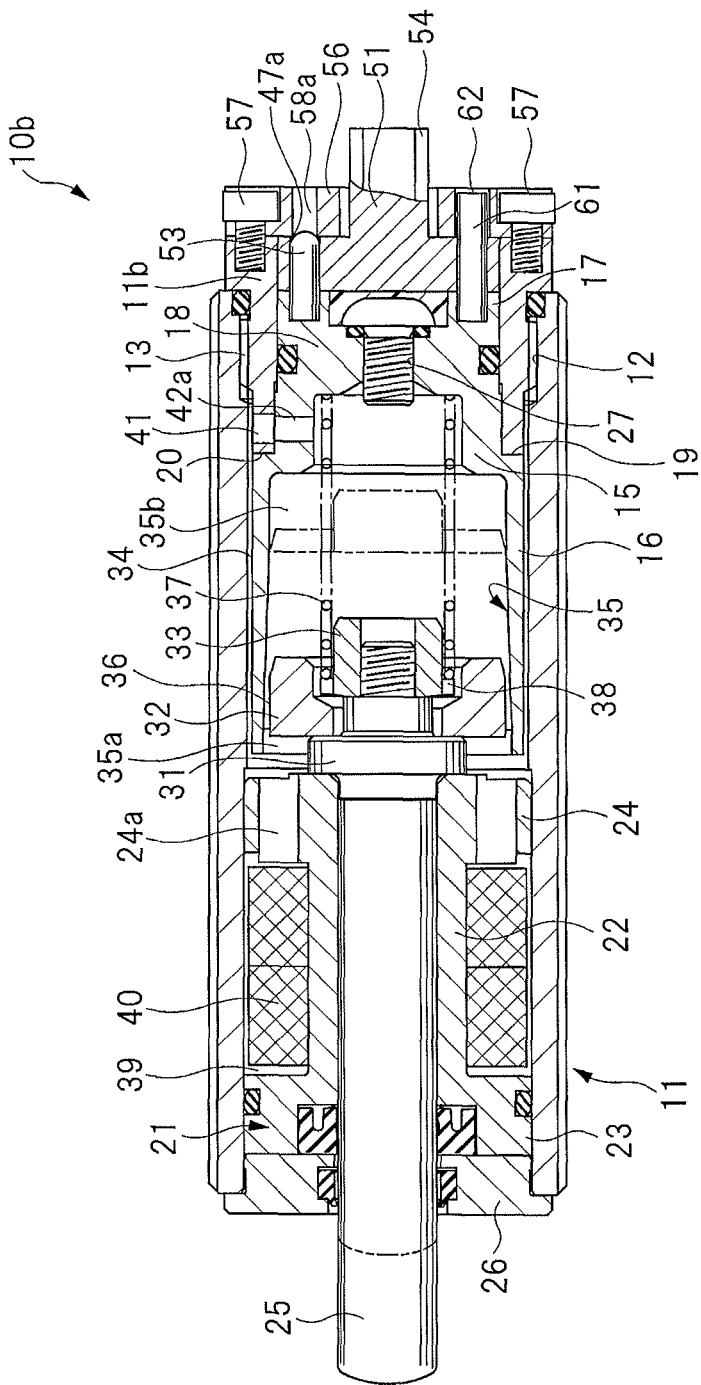
FIG. 14 is a longitudinal sectional view showing a shock absorber according to still another embodiment of the present invention.
Figure 15:
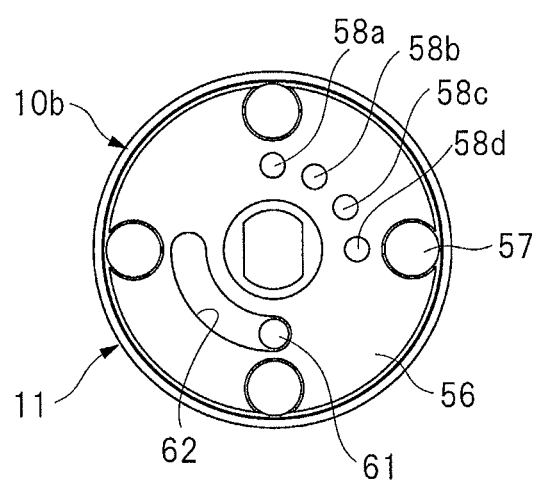
FIG. 15 is a right side view of FIG. 14.

FIG. 14 is a longitudinal sectional view showing a shock absorber 10b according to still another embodiment of the present invention, and FIG. 15 is a right side view of FIG. 14.

As shown in FIG. 14, the operation plug 51 abuts on a distal end surface of the rotation operation portion 15, and the positioning pin 53 is attached to the rotation operation portion 15. The positioning pin 53 protrudes from the operation plug 51 in the axial direction of the case 11. An annular end wall member 56 is fixed to a distal end surface of the distal case 11b with a screw member 57, and engaging holes 58a to 58d are formed on the end wall member 56. The above-mentioned positioning recesses 47a to 47d are respectively formed on inner ends of the engaging holes 58a to 58d. FIG. 14 shows the shock absorber 10b in a state in which the positioning pin 53 is set in the positioning recess 47a.

As in the above-mentioned embodiments, the rotation operation portion 15 is positioned to its rotated position by the positioning pin 53 and the positioning recesses 47a to 47d that collectively serve as positioning means. The positioning means is constituted by the positioning pin 53 and the positioning recesses 47a to 47d.

A gap is formed between the rotation operation portion 15 and a bottom surface of the operation plug 51, preventing the rotation operation portion 15 to be in close contact with the bottom surface of the operation plug 51. When the shock absorber absorbs impact, pressure of the fluid is increased, and impact is applied to the rotation cylinder 14 in the direction toward the distal end portion of the rotation cylinder 14. Moreover, since the compression coil spring 37 is further compressed by the piston 32, a force is further applied to the rotation cylinder 14 in the direction toward the distal end portion of the rotation cylinder 14. This impact and force applied to the rotation cylinder 14 in the direction toward the distal end portion of the rotation cylinder 14 are transmitted from the stepped surface 19 of the rotation cylinder 14 to the distal case 11*b*. However, since the gap is formed between the rotation operation portion 15 and the operation plug 51, impact and force applied to the rotation cylinder 14 in the direction toward the distal end portion of the rotation cylinder 14 are prevented from being transmitted to the positioning pin 53 and the bottom surface of the corresponding positioning recess. Thus, the positioning pin 53 and the bottom surface of the corresponding positioning recess are protected and are prevented from damage or breakage. In other words, since the stepped surface 19 of the rotation cylinder 14 and the stopper surface 20 abut on each other, impact and force applied to the rotation cylinder 14 are transmitted from the rotation cylinder 14 to the case 11 without being transmitted to other members of the shock absorber. Thus, durability of the shock absorber may be improved. It should be noted that the above-mentioned gap is not limited to be formed between the rotation operation portion 15 and the operation plug 51. For example, the gap may be formed between the operation plug 51 and the end wall member 56.

A guide pin 61 serving as a guide protrusion is provided on a distal end portion of the rotation operation portion 15, and the guide pin 61 extends through and protrudes from the rotation operation portion 15 in an axial direction of the rotation operation portion 15. An arcuate rotation regulating hole 62 extending in a circumferential direction of the case 11 is formed on the end wall member 56, and the guide pin 61 is inserted into the rotation regulating hole 62. The guide pin 61 abuts on an end surface of the rotation regulating hole 62, thereby regulating a rotation range of the rotation cylinder 14. In each of the shock absorbers 10 and 10*a* shown in FIGS. 1 and 12, the positioning pin 53 abuts on an end portion of the guide hole 43, thereby regulating the rotation range of the rotation cylinder 14, whereas in the shock absorber 10*b* shown in FIG. 14, the guide pin 61 abuts on the end surface of the rotation regulating hole 62, thereby regulating the rotation range of the rotation cylinder 14.

Figure 16:
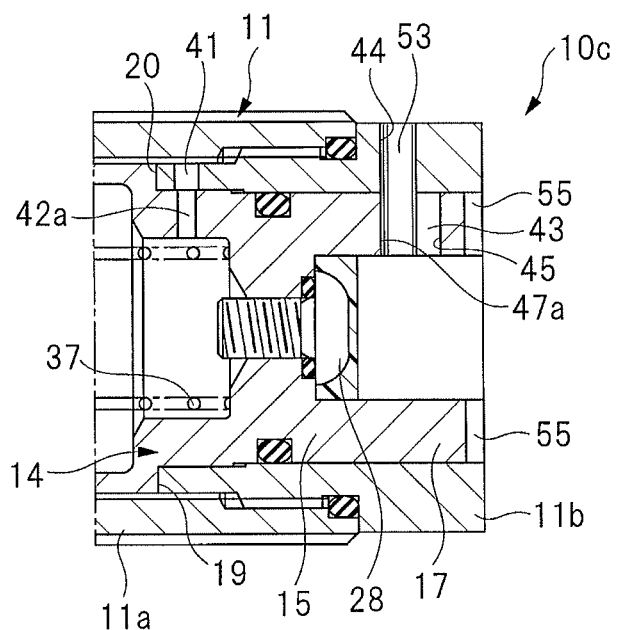
FIG. 16 is a sectional view showing a portion of a shock absorber according to still another embodiment of the present invention.

FIG. 16 is a sectional view showing a portion of a shock absorber 10*c* according to still another embodiment of the present invention, and the shock absorber 10*c* is a modification of the shock absorber 10*a* shown in FIG. 12. In the shock absorber 10*a* shown in FIG. 12, the guide hole 43 is formed on the distal cylindrical portion 17 of the rotation operation portion 15. The positioning pin 53 is attached to a distal end portion of the distal cylindrical portion 17, protrudes radially outward from the distal cylindrical portion 17, and extends into the guide hole 43. In contrast, in the shock absorber 10*c* shown in FIG. 16, the above-mentioned positioning recesses 47*a* to 47*d* are formed on the front-side circumferential surface 44 of the guide hole 43. FIG. 16 shows the shock absorber 10*c* in a state in which the positioning pin 53 is positioned in the positioning recess 47*a*. Therefore, as in the above-mentioned embodiments, when the rotation cylinder 14 is rotated, the positioning pin 53 is released from the positioning recess 47*a* and moves onto the front-side circumferential surface 44 between the positioning recess 47*a* and the positioning recess 47*b*. When the rotation cylinder 14 is further rotated, the positioning pin 53 is positioned in the positioning recess 47*b* by the spring force of the compression coil spring 37. In this manner, a position of the through holes 42*a* to 42*d* may be switched from each other to communicate with the communication hole 41.

In a structure in which the operation plug 51 is provided on the distal cylindrical portion 17 of the rotation operation portion 15 as shown in FIG. 1, the guide hole 43 may also be formed on the distal cylindrical portion 17.

Figure 17:
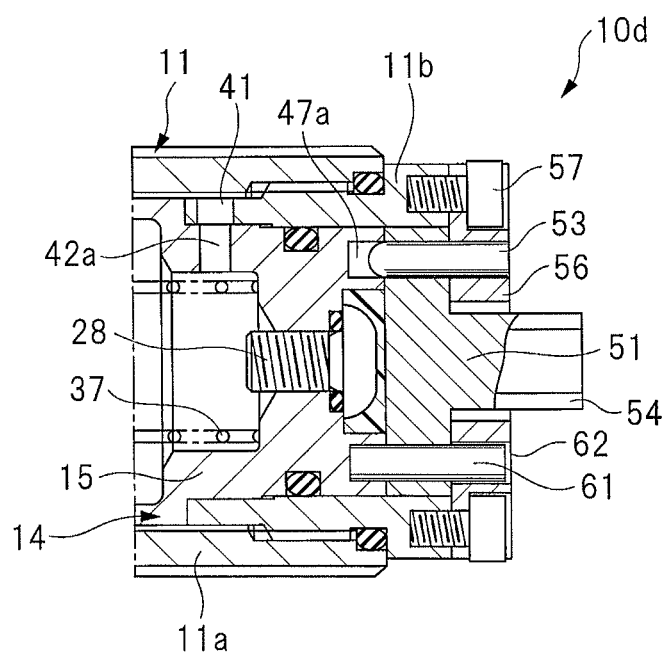
FIG. 17 is a sectional view showing a portion of a shock absorber according to still another embodiment of the present invention.

FIG. 17 is a sectional view showing a portion of a shock absorber 10*d* according to still another embodiment of the present invention, and the shock absorber 10*d* is a modification of the shock absorber 10*b* shown in FIG. 14. In the shock absorber 10*d* shown in FIG. 17, the positioning pin 53 is attached to the end wall member 56 and protrudes inward toward the distal end portion of the rotation operation portion 15. The positioning recesses 47*a* to 47*d*, each constituted by an opening portion and a bottomed hole, are formed on the distal end portion of the rotation operation portion 15. As in the shock absorber 10*b* shown in FIG. 14, the shock absorber 10*d* shown in FIG. 17 has a gap formed between the rotation operation portion 15 and the operation plug 51. The gap is not limited to be formed between the rotation operation portion 15 and the operation plug 51. For example, the gap may be formed between the operation plug 51 and the end wall member 56. When the shock absorber absorbs impact, impact is applied to the rotation cylinder 14 in the direction toward the distal end portion of the rotation cylinder 14, and thus, impact and force are transmitted to the distal case 11*b* from the rotation cylinder 14, but are prevented from being transmitted to the operation plug 51 and the end wall member 56 by the gap. Thus, the operation plug 51 and the end wall member 56 are prevented from damage or breakage.

In the structures shown in FIGS. 1 and 12, the positioning pin 53 is provided on the rotation operation portion 15, and the positioning recesses 47*a* to 47*d* are formed on the case 11. In contrast, in the structures shown in FIGS. 16 and 17, the positioning pin 53 is provided on the case 11, and the positioning recesses 47*a* to 47*d* are formed on the rotation operation portion 15. In this manner, the positioning recesses may be formed on either of the rotation operation portion 15 and the case 11, and the positioning pin 53 may be formed on the other of the rotation operation portion 15 and the case 11.

Figure 18:
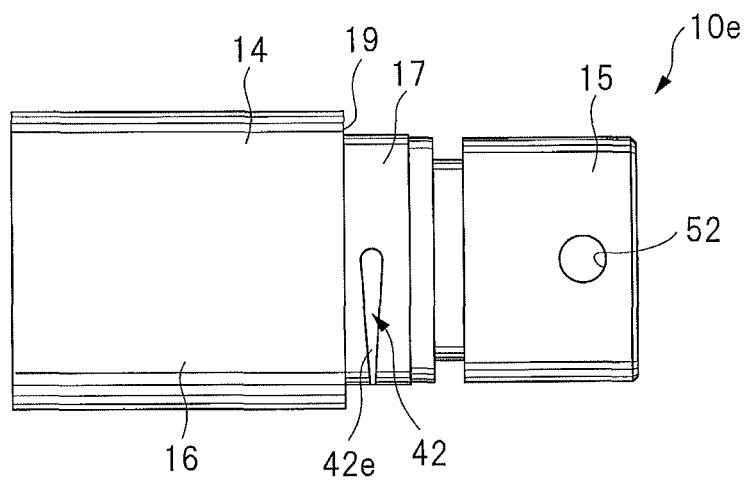
FIG. 18 is a plan view showing a rotation cylinder of a shock absorber according to still another embodiment of the present invention.

FIG. 18 is a plan view showing a rotation cylinder of a shock absorber 10*e* according to still another embodiment of the present invention. The orifice 42 formed on the rotation operation portion 15 of the rotation cylinder 14 is formed by a tapered groove 42*e* that extends along a circumferential direction of the rotation cylinder 14 and has a groove width that varies according to a position in the circumferential direction. In this structure, the communication opening degree with respect to the communication hole 41 of the orifice 42 is continuously changed as the rotation cylinder 14 is rotated. By rotating the rotation cylinder 14, any of the communication opening degrees may be selected in a stepwise manner.

Figure 19:
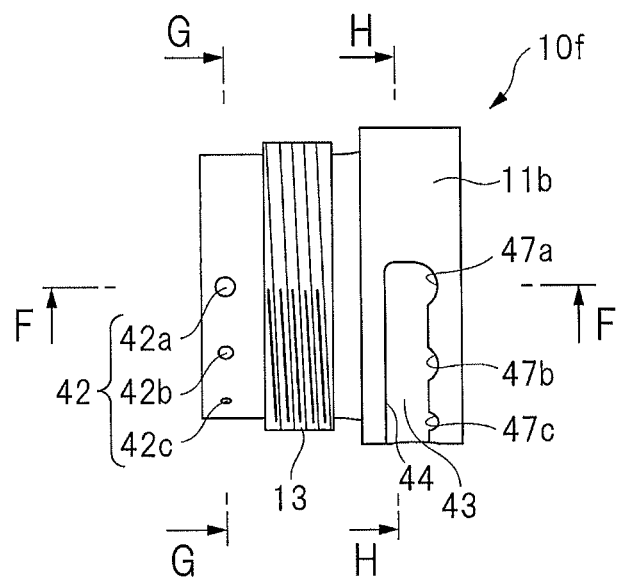
FIG. 19 is a plan view showing a distal case of a shock absorber according to still another embodiment of the present invention.
Figure 20:
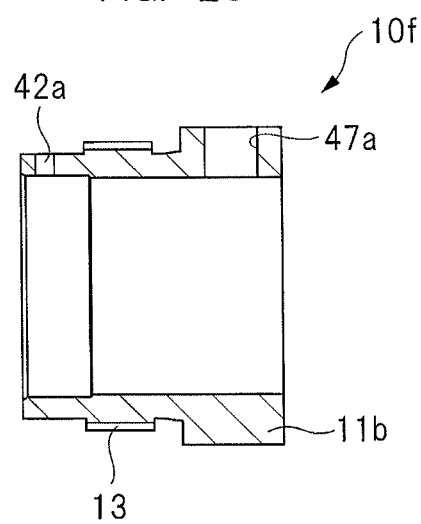
FIG. 20 is a sectional view taken along line F-F of FIG. 19.
Figure 21:
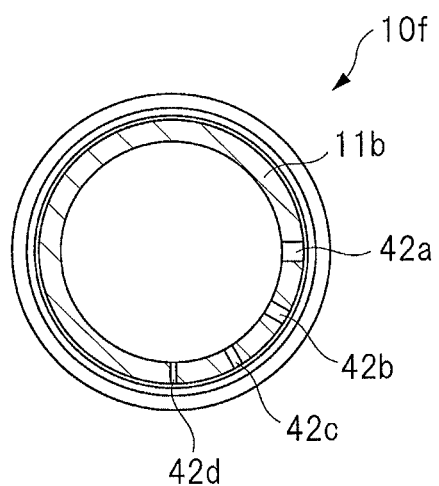
FIG. 21 is a sectional view taken along line G-G of FIG. 19.
Figure 22:
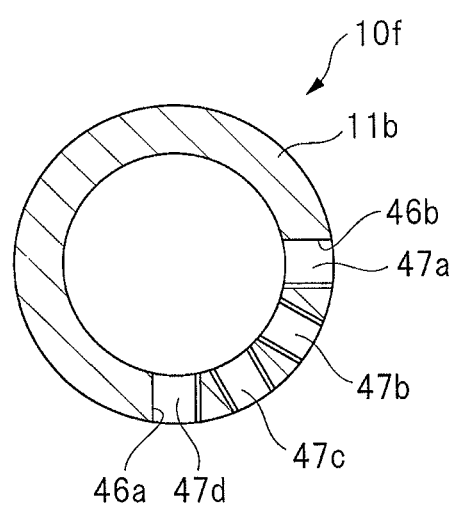
FIG. 22 is a sectional view taken along line H-H of FIG. 19.
Figure 23:
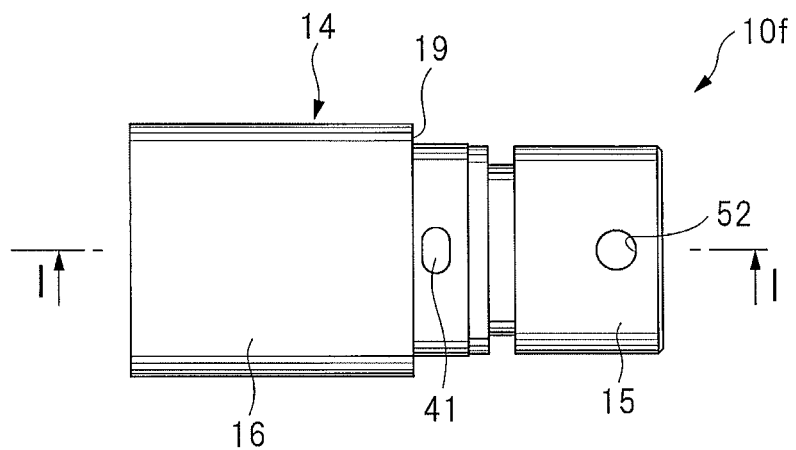
FIG. 23 is a plan view showing a rotation cylinder on which the distal case of FIG. 19 is mounted.
Figure 24:
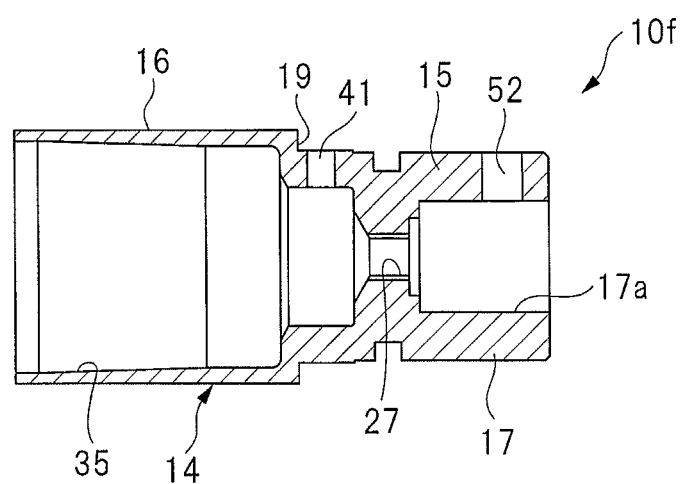
FIG. 24 is a sectional view taken along line I-I of FIG. 23.

FIG. 19 is a plan view showing the distal case 11*b* of a shock absorber 10*f* according to still another embodiment of the present invention. FIG. 20 is a sectional view taken along line F-F of FIG. 19, FIG. 21 is a sectional view taken along line G-G of FIG. 19, and FIG. 22 is a sectional view taken along line H-H of FIG. 19. FIG. 23 is a plan view of the rotation cylinder 14 to which the distal case 11*b* shown in FIG. 19 is mounted. FIG. 24 is a sectional view taken along line I-I of FIG. 23.

In the shock absorber 10 shown in FIG. 1 to FIG. 11, the orifice 42 is formed on the rotation cylinder 14, and the communication hole 41 is formed on the distal case 11b. In other words, the orifice 42 is constituted by the through holes respectively having inner diameters that differ from each other and spaced apart from each other at intervals in a rotation direction of the rotation operation portion 15.

In contrast, in the shock absorber 10f shown in FIG. 19 to FIG. 24, the orifice 42 is formed on the distal case 11b, and the communication hole 41 is formed on the rotation cylinder 14. In other words, the orifice 42 is constituted by the through holes respectively having inner diameters that differ from each other and spaced apart from each other at intervals in the circumferential direction of the distal case 11b. As in the above-mentioned embodiments, the communication opening degree may be adjusted by rotating the rotation cylinder 14. Therefore, the orifice 42 may be formed on either of the rotation cylinder 14 and the distal case 11b, and the communication hole 41 may be formed on the other of the rotation cylinder 14 and the distal case 11b.

Figure 25:
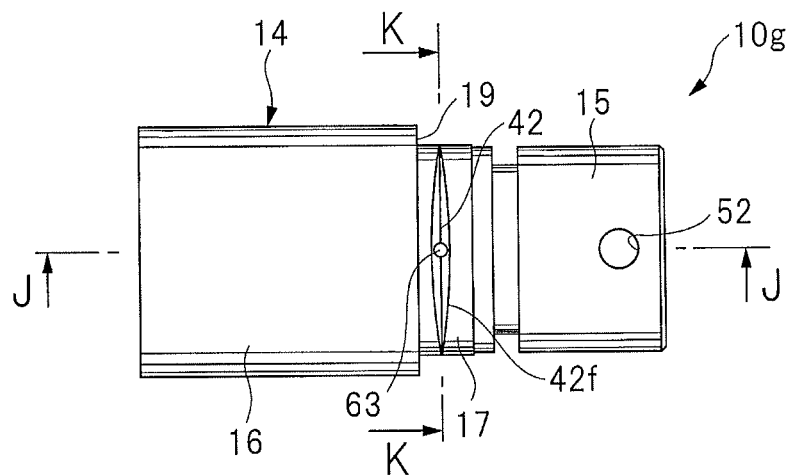
FIG. 25 is a plan view showing a rotation cylinder of a shock absorber according to still another embodiment of the present invention.
Figure 26:
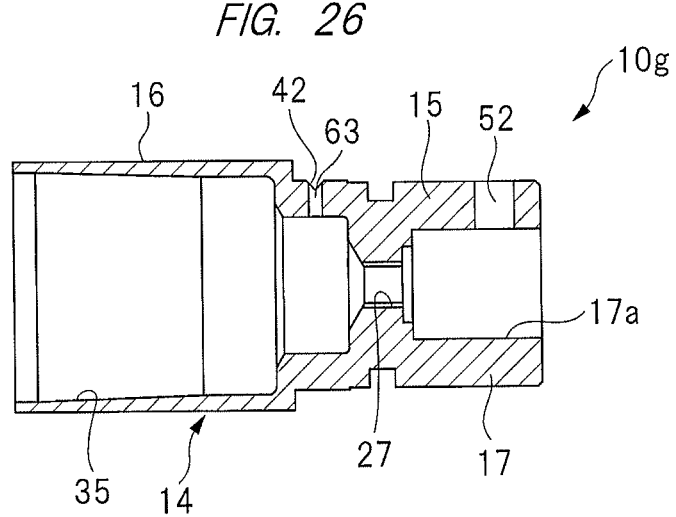
FIG. 26 is a sectional view taken along line J-J of FIG. 25.
Figure 27:
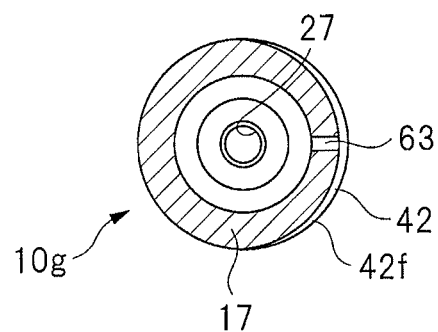
FIG. 27 is a sectional view taken along line K-K of FIG. 25.

FIG. 25 is a plan view showing the rotation cylinder 14 of a shock absorber 10g according to still another embodiment of the present invention. FIG. 26 is a sectional view taken along line J-J of FIG. 25, and FIG. 27 is a sectional view taken along line K-K of FIG. 25.

In this shock absorber 10g, the orifice 42 is formed on the rotation cylinder 14. The orifice 42 has a through hole 63 that extends through the distal cylindrical portion 17, and a tapered groove 42f is formed on the distal cylindrical portion 17 and extends in the circumferential direction of the distal cylindrical portion 17, the through hole 63 being at a center of the tapered groove 42f. As shown in FIG. 27, the tapered groove 42f has a depth that gradually decreases toward the circumferential direction of the distal cylindrical portion 17 from the through hole 63 at the center of the tapered groove 42f. Moreover, as shown in FIG. 25, the tapered groove 42f also has a width that gradually narrows toward the circumferential direction of the distal cylindrical portion 17 from the through hole 63 at the center of the tapered groove 42f. In a structure in which the orifice 42 has such a shape, the communication opening degree may be adjusted by rotating the rotation cylinder 14, as in the above-mentioned embodiments.

Figure 28:
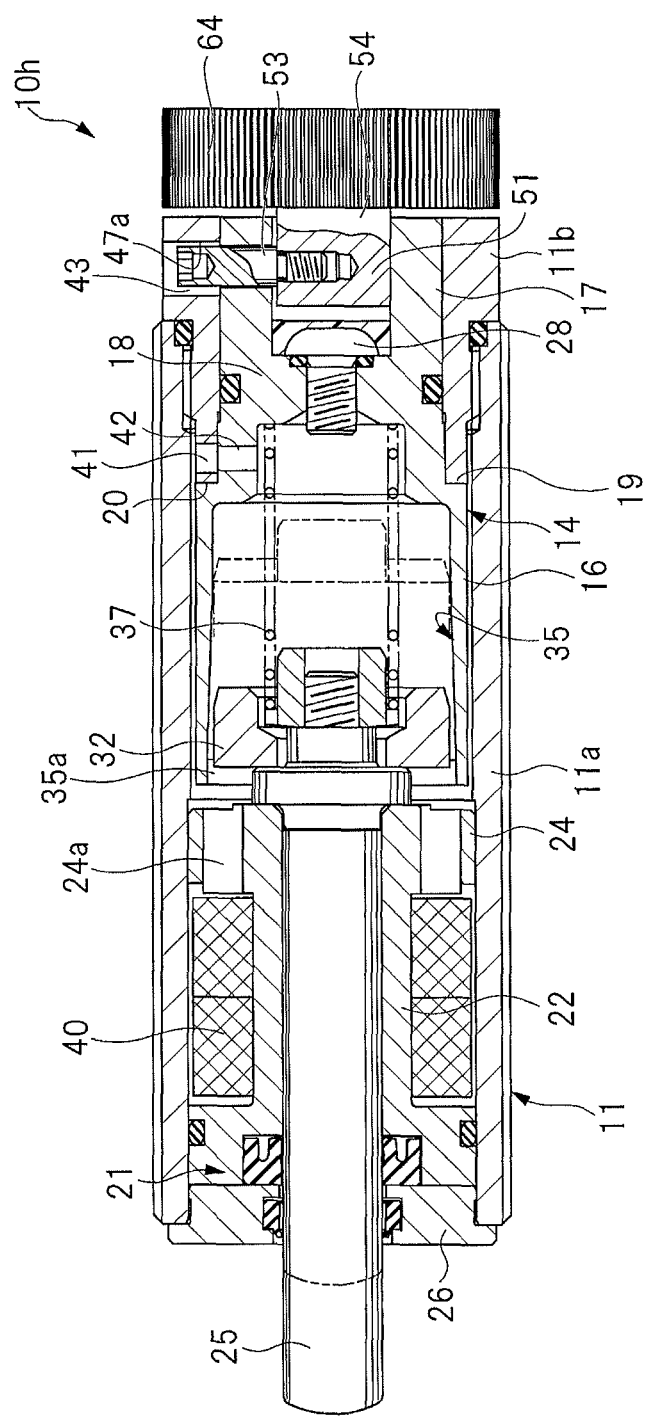
FIG. 28 is a longitudinal sectional view showing a shock absorber according to still another embodiment of the present invention.

FIG. 28 is a longitudinal sectional view showing a shock absorber 10h according to still another embodiment of the present invention. In this shock absorber 10h, an operation dial 64 having a knurled outer peripheral surface is provided on the operation plug 51, and the operation dial 64 protrudes outward from the distal end portion of the case 11. Thus, in the shock absorber 10h, the operation dial 64 partially corresponds to the protrusion portion 54 of the operation plug 51 shown in FIG. 1. Therefore, the rotation cylinder 14 may be directly rotated by the operator's hand without the need of any rotation operation tool, such as a wrench.

In each of the above-mentioned shock absorbers 10 to 10h, the rotation cylinder 14 disposed inside the case 11 is rotated to change the communication opening degree between the rear-side chamber 35b in the cylinder hole 35 and the fluid passage 34, and thus, the damping characteristic of each of the shock absorbers 10 to 10h is easily adjusted and operability of the shock absorber is enhanced. Moreover, the compression coil spring 37 required for configuring the shock absorber has a spring force that is utilized for both maintaining a state in which the positioning pin 53 is positioned in any one of the positioning recesses 47a to 47d, and generating a "click" feeling when the rotation cylinder 14 is rotated. By utilizing the spring force of the compression coil spring 37 in this manner, the number of components for the shock absorber may be reduced, and the shock absorber may be configured to have high reliability and less failures.

The present invention is not to be limited to the above-mentioned embodiments, and various modifications can be made as long as they do not depart from the gist of the invention.

The shock absorber is utilized to stop a workpiece or another moving member within a mass production line or the like without applying an impact force to the moving member.

Although various embodiments of the present invention have been described and shown, the invention is not restricted thereto, but may also be embodied in other ways within the scope of the subject-matter defined in the following claims.

What is claimed is:

1. A shock absorber comprising:
   a case in which a piston rod is disposed and in which fluid is filled, the piston rod being reciprocable in an axial direction of the case;
   a rotation cylinder having: a cylindrical portion; and a rotation operation portion that is rotatably supported by a distal end portion of the case and is movable in the axial direction of the case;
   a piston that is provided on a distal end portion of the piston rod and partitions an inside of the cylindrical portion into a front-side chamber and a rear-side chamber;
   a spring member that is disposed inside the rear-side chamber and abuts on the rotation cylinder, the piston rod being urged by a spring force of the spring member toward a direction in which a protruding end portion of the piston rod protrudes from a proximal end portion of the case; and
   an orifice that is changed in size according to a rotated position of the rotation operation portion,
   wherein a stepped surface of the rotation cylinder and a stopper surface of the case are capable of abutting on each other.

2. The shock absorber according to claim 1, further comprising:
   a fluid passage that is formed between an inner peripheral surface of the case and the cylindrical portion,
   wherein the rear-side chamber and a distal end portion of the fluid passage communicate with each other, and the front-side chamber and a proximal end portion of the fluid passage communicate with each other.

3. The shock absorber according to claim 1, further comprising:
   a fluid passage that is formed between an inner peripheral surface of the case and the cylindrical portion; and
   a communication hole that is formed on the case and allows the fluid passage and the orifice to communicate with each other,
   wherein the orifice is formed on the rotation operation portion, and
   a communication opening degree between the orifice and the fluid passage varies according to the rotated position of the rotation operation portion.

4. The shock absorber according to claim 1, further comprising:
   a fluid passage that is formed between an inner peripheral surface of the case and the cylindrical portion; and a communication hole that is formed on the rotation operation portion and allows the rear-side chamber and the orifice to communicate with each other, wherein the orifice is formed on the case, and a communication opening degree between the orifice and the fluid passage varies according to the rotated position of the rotation operation portion.

5. The shock absorber according to claim 1, wherein the orifice is constituted by a plurality of through holes which respectively have inner diameters that differ from each other and which are spaced apart from each other at intervals in a rotation direction of the rotation operation portion.

6. The shock absorber according to claim 1, wherein the orifice is constituted by a plurality of through holes which respectively have inner diameters that differ from each other and which are spaced apart from each other at intervals in a circumferential direction of the case.

7. The shock absorber according to claim 1, wherein the orifice is constituted by a tapered groove which is formed on the rotation operation portion, which extends in a circumferential direction of the rotation operation portion, which is formed on the rotation operation portion and which has a groove width that varies along the circumferential direction of the rotation operation portion.

* * * * *